United States Patent
Huwyler et al.

(10) Patent No.: US 9,018,818 B2
(45) Date of Patent: Apr. 28, 2015

(54) INSULATING CAP FOR AN END WINDING OF AN ELECTRICAL MACHINE WORKING AT HIGH VOLTAGE AND MACHINE HAVING SUCH AN INSULATING CAP

(75) Inventors: Markus Huwyler, Muri (CH); Andreas Koepfler, Waldshut (DE); Thomas Klamt, Schinznach-Dorf (CH)

(73) Assignee: Alstom Renewable Technologies, Grenoble (FR)

( * ) Notice: Subject to any disclaimer, the term of this patent is extended or adjusted under 35 U.S.C. 154(b) by 280 days.

(21) Appl. No.: 13/457,557

(22) Filed: Apr. 27, 2012

(65) Prior Publication Data
US 2012/0274186 A1 Nov. 1, 2012

(30) Foreign Application Priority Data

Apr. 29, 2011 (CH) .......................................... 732/11
May 20, 2011 (CH) .......................................... 861/11

(51) Int. Cl.
*H02K 11/00* (2006.01)
*H01B 17/06* (2006.01)
(Continued)

(52) U.S. Cl.
CPC *H02K 3/38* (2013.01); *H02K 11/00* (2013.01); *H02K 1/16* (2013.01); *H02K 55/04* (2013.01); *H02K 3/40* (2013.01)

(58) Field of Classification Search
CPC .............. H02K 1/16; H02K 3/38; H02K 3/40; H02K 11/00; H02K 55/04; H01B 17/06
USPC ............ 310/71, 201, 68 R; 174/137 R, 138 R
IPC ............................................ H02K 11/00, 17/06
See application file for complete search history.

(56) References Cited

U.S. PATENT DOCUMENTS

| 4,309,636 | A | | 1/1982 | Pollok |
| 5,729,068 | A | * | 3/1998 | Gasparini et al. ............. 310/179 |

(Continued)

FOREIGN PATENT DOCUMENTS

| DE | 128015 B | 10/1968 |
| DE | 4237079 A1 | 5/1994 |

(Continued)

OTHER PUBLICATIONS

European Patent Office, Search Report in Swiss Patent Application No. 8612011 (Oct. 20, 2011).
Office Action (Notification of Reasons for Refusal) issued on Nov. 25, 2014, by the Japan Patent Office in corresponding Japanese Patent Application No. 2012-104961, and an English Translation of the Office Action. (9 pages).

*Primary Examiner* — John K Kim
(74) *Attorney, Agent, or Firm* — Buchanan Ingersoll & Rooney PC

(57) ABSTRACT

An insulating cap is provided for an end winding of an electrical machine working at a high voltage, the end winding including a plurality of insulated winding bars protruding from respective winding slots and electrically conductively connected to one another in pairs at their ends so as to form a plurality of electrical connections. The cap includes an opening allowing the insulating cap to be pushed over a region of one of the electrical connections such that the insulating cap insulates an outside of the electrical connection. An interior includes a layer configured to gradually dissipate a high electrical field in the region of the electrical connection to an outside of the insulating cap, the outside of the insulating cap being at earth potential.

8 Claims, 3 Drawing Sheets

(51) Int. Cl.
*H02K 3/38* (2006.01)
*H02K 3/40* (2006.01)
*H02K 1/16* (2006.01)
*H02K 55/04* (2006.01)

(56) References Cited

U.S. PATENT DOCUMENTS

| | | | |
|---|---|---|---|
| 7,414,195 B2 * | 8/2008 | Janah et al. | 174/73.1 |
| 7,868,079 B2 * | 1/2011 | Onneby et al. | 524/431 |
| 2002/0163272 A1 | 11/2002 | Larsson et al. | |
| 2006/0145119 A1 * | 7/2006 | Onneby et al. | 252/62.3 R |
| 2007/0270023 A1 | 11/2007 | Mahieux et al. | |
| 2008/0012442 A1 | 1/2008 | Baenziger et al. | |
| 2008/0236865 A1 * | 10/2008 | Emery et al. | 174/113 |
| 2012/0274186 A1 * | 11/2012 | Huwyler et al. | 310/68 R |

FOREIGN PATENT DOCUMENTS

| | | |
|---|---|---|
| EP | 1821389 A1 | 8/2007 |
| EP | 1903662 A1 | 3/2008 |
| EP | 2278688 A1 | 1/2011 |
| JP | 56-080645 U | 6/1981 |
| JP | 57160342 A | 10/1982 |
| JP | 59-086448 A | 5/1984 |
| JP | 62-104449 A | 5/1987 |
| JP | 2001-504677 A | 4/2001 |
| WO | 98/20595 A1 | 5/1998 |
| WO | WO 2004038735 A1 | 5/2004 |
| WO | WO 2006056542 A1 | 6/2006 |

\* cited by examiner

INSULATING CAP FOR AN END WINDING OF AN ELECTRICAL MACHINE WORKING AT HIGH VOLTAGE AND MACHINE HAVING SUCH AN INSULATING CAP

CROSS-REFERENCE TO PRIOR APPLICATIONS

Priority is claimed to Swiss Patent Application Nos. CH 00732/11, filed on Apr. 29, 2011, and CH 00861/11, filed on May 20, 2011. The entire disclosure of both applications is hereby incorporated by reference herein.

FIELD

The present invention relates to the field of electrical machines and to an insulating cap for an end winding. It also relates to an electrical machine having an end winding with such insulating caps.

BACKGROUND

The electrical windings (of the rotor or stator) of electrical machines working at high voltage, e.g. electric generators or motors, in particular slip-ring rotor motors, have end windings at the ends in which the winding bars protruding from the slots of the laminated cores are conductively connected to one another in pairs. The electrical connection is frequently made by means of lugs which are soldered to the conductor ends of the winding bars from which the insulation has been removed. The connecting points are then electrically insulated by pushing on special insulating caps. Examples of such end windings are described in publications DE 1 281 015 B, DE 42 37 079 A1, EP 1 821 389 A1 or U.S. Pat. No. 4,309,636 A.

Insulating caps for end windings of electrical machines working at high voltage which are at high-voltage potential cannot be earthed on the outside.

Furthermore, a gradient material can be provided on the inside of insulating caps (see, for example, WO 2004038735 A1) in order to reduce the electrical field strength in the interior of the insulating cap. The outside of insulating caps of this type is still at high voltage however, so that the external surface cannot be earthed.

SUMMARY OF THE INVENTION

In an embodiment, the present invention provides an insulating cap for an end winding of an electrical machine working at a high voltage, the end winding including a plurality of insulated winding bars protruding from respective winding slots and electrically conductively connected to one another in pairs at their ends so as to form a plurality of electrical connections. The cap includes an opening allowing the insulating cap to be pushed over a region of one of the electrical connections such that the insulating cap insulates an outside of the electrical connection. An interior includes a layer configured to gradually dissipate a high electrical field in the region of the electrical connection to an outside of the insulating cap, the outside of the insulating cap being at earth potential.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

However, it would be advantageous for various electrical and mechanical reasons to be able to earth the external surface of such insulating caps. Insulating caps which are at high voltage on the inside and can assume any voltage potential between high voltage and earth potential on the outside would be necessary for this purpose.

In an embodiment of the invention, insulating caps are provided which enable the external surface to be earthed.

Furthermore, in an embodiment of the invention, an electrical machine is provided having an end winding with insulating caps of this kind.

In an embodiment, the invention starts from an insulating cap for the end winding of an electrical machine working at high voltage, which end winding comprises a plurality of insulated winding bars which protrude from winding slots and are electrically conductively connected to one another in pairs at their ends, wherein the region of the electrical connection is in each case insulated with respect to the outside by an insulating cap which is pushed over said connection with an opening. It is distinguished in that the insulating cap has means in the interior which enable the high electric field in the region of the electrical connection to be gradually dissipated to the outside of the insulating cap which is at earth potential.

An embodiment of the invention is characterized in that the gradual dissipation means comprise a gradient layer made of a gradient material which, when the insulating cap is pushed on, reaches from the region of the electrical connection to the opening of the insulating cap.

An improvement of this embodiment is distinguished in that the insulating cap has a central insulating layer which is provided on the outside with an outer conductor layer or semiconductor layer, in that an inner conductor layer or semiconductor layer is arranged on the inside of the central insulating layer in the region of the electrical connection, and in that the gradient layer reaches from the inner conductor layer or semiconductor layer to the opening of the insulating cap.

In particular, in an embodiment, the gradient layer overlaps the inner conductor layer or semiconductor layer in a limited overlapping zone.

Another embodiment is characterized in that the gradient layer is extensively embedded in the central insulating layer of the insulating cap.

Yet another embodiment is characterized in that the gradient layer is extensively arranged on the central insulating layer of the insulating cap.

The electrical machine working at high voltage according to an embodiment of the invention, which comprises a winding having an end winding, is characterized in that the end winding is fitted with insulating caps according to the invention.

Preferably, at least one insulating cap of the end winding is earthed on the outside.

In particular, all insulating caps of the end winding are earthed on the outside or the whole end winding is earthed.

Figure 1:
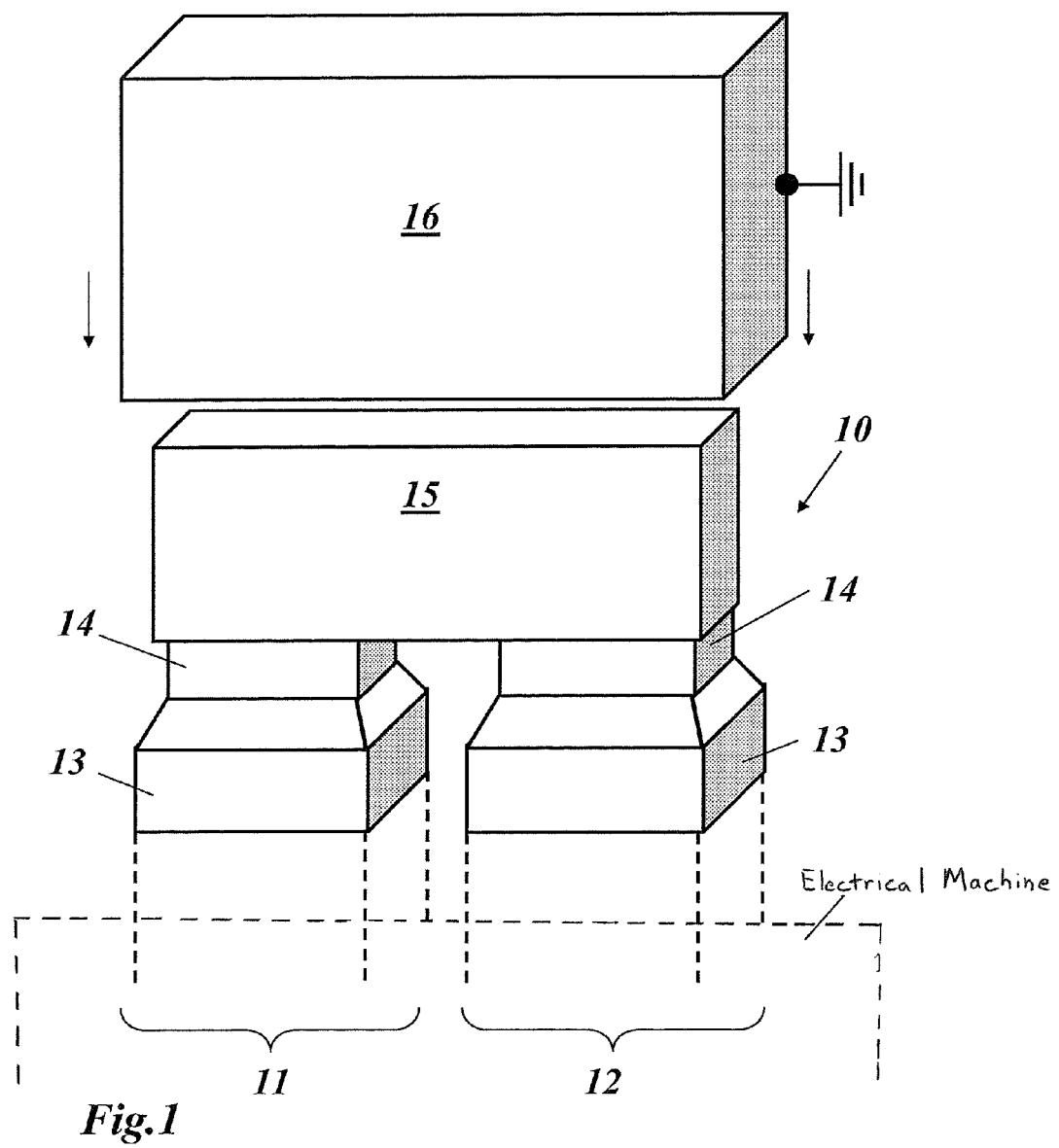
FIG. 1 shows, in a perspective, simplified side view, two winding bars of an end winding which are electrically connected to one another at the ends and are insulated with respect to the outside by a push-on insulating cap.

Two winding bars 11 and 12 of an end winding 10, which are electrically connected to one another at the ends and are insulated with respect to the outside by a push-on insulating cap 16, are shown in a perspective, simplified side view in FIG. 1. In order to insulate them against the laminated core, in the slots of which they are accommodated, the winding bars 11 and 12 are encompassed by an external insulation 13 which is removed at the ends of the winding bars 11, 12 in order to expose the central electrical conductors 14 of the winding bars 11, 12 for the electrical connection. A special lug 15, which for example is soldered to the exposed conductor ends of the winding bars 11, 12, is used for the electrical connection. The insulating cap 16 is provided to insulate the electrical connection 14, 15.

According to the invention, the insulating cap 16 is designed so that the electrical connection 14, 15 can be at high-voltage potential, while the outside of the insulating cap 16 can be maintained at earth potential or at any potential between earth potential and high-voltage potential. This is achieved by special means which are provided in the interior of the insulating cap 16. These special means comprise a gradient layer which can be arranged in different ways in the interior of the insulating cap 16. Two exemplary embodiments of this arrangement are shown in longitudinal section in FIGS. 2 and 3.

Figure 2:
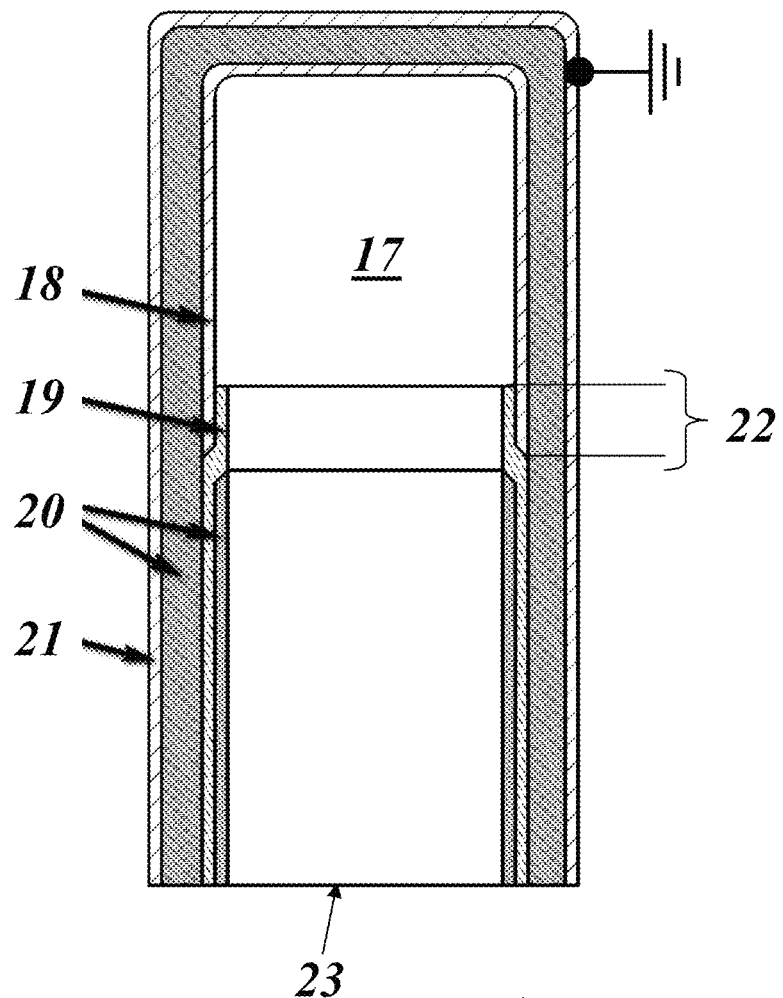
FIG. 2 shows the section through an insulating cap according to a first exemplary embodiment of the invention.

FIG. 2 shows an insulating cap 16a which, in longitudinal section, has a U-shaped profile which forms an interior 17 and is provided with an opening 23 on one side. The insulating cap 16a has a central insulating layer 20 which is covered on the outside over its whole surface by an outer conductor layer or semiconductor layer 21. An inner conductor layer or semiconductor layer 18 is arranged on the inside of the central insulating layer 20 in the region which accommodates the electrical connection 14, 15. A gradient layer 19, which reaches from the inner conductor layer or semiconductor layer 18 to the opening 23 of the insulating cap 16a, is also provided. In this exemplary embodiment, the gradient layer 19 is extensively embedded in the central insulating layer 20 of the insulating cap 16a. It overlaps the inner conductor layer or semiconductor layer 18 in a limited overlapping zone 22.

Figure 3:
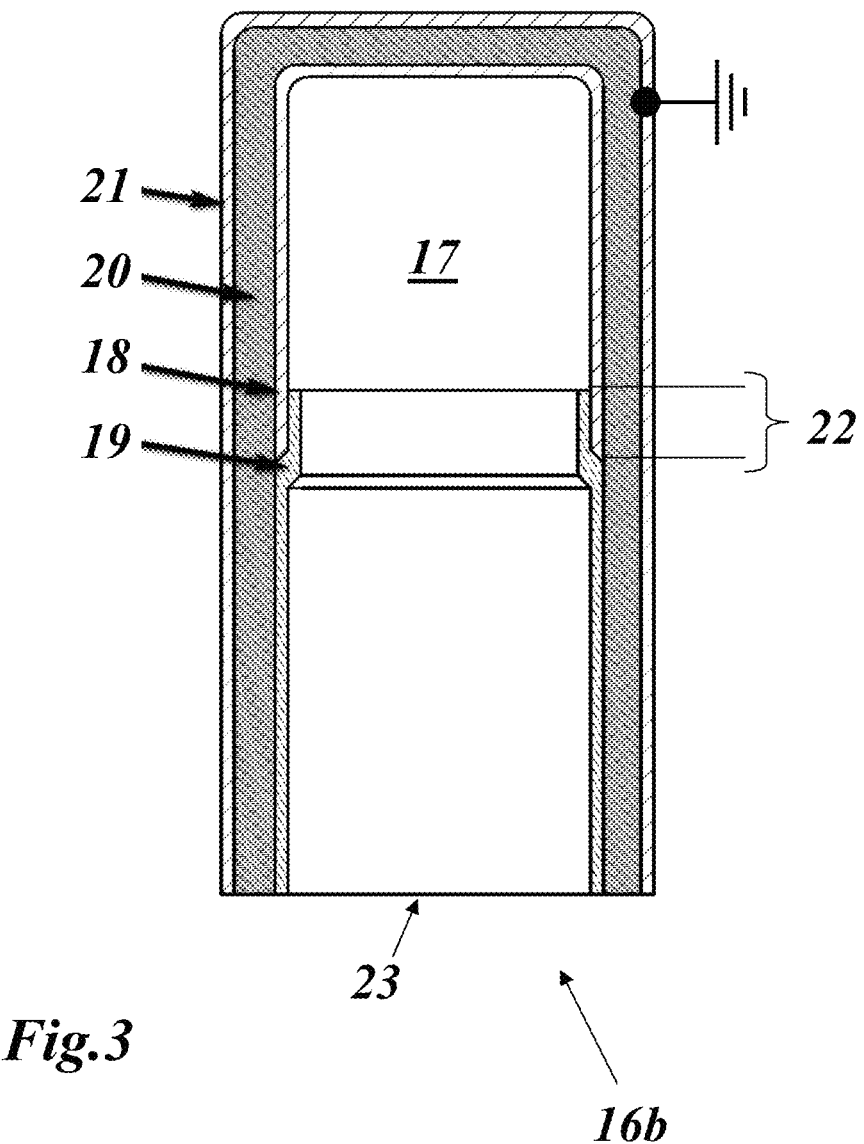
FIG. 3 shows the section through an insulating cap according to a second exemplary embodiment of the invention.

In the exemplary embodiment of FIG. 3, the gradient layer 19 of the insulating cap 16b is extensively arranged on the surface of the central insulating layer 20 of the insulating cap 16b. A limited overlapping zone 22 with the inner conductor layer or semiconductor layer 18 is also provided here.

The gradient layer 19 produces (in operation) an electrical gradient field which reaches from the high voltage in the region of the electrical connection 14, 15 to the outer surface 21 of the insulating cap 16a,b and therefore enables a freely selectable potential on the outer surface 21. A gradient material, such as that described in publication WO 2004038735 A1 mentioned in the introduction, is for example a possible material for the gradient layer 19.

An earthing of individual caps and also an earthing of the whole end winding become possible with an insulating cap 16a,b of this kind. If, for example, the surface of the winding bars within the machine is earthed, this reduces or entirely removes the risk of unwanted partial discharges in the air.

A further advantage consists in that the earthed insulating caps enable a mechanical fixing to earthed parts of the machine. This significantly improves the mechanical stability and simplifies the design of the end winding.

Further advantages, particularly in conjunction with high-voltage machines such as generators, motors or slip-ring rotor motors, are improved efficiency, higher availability and—in the case of slip-ring rotor motors—increased operating safety under critical environmental conditions. Depending on the type of machine, the insulating caps according to the invention can be used with the rotor winding and/or the stator winding.

A further advantage of the insulating caps according to the invention consists in that their use enables whole end windings to be earthed.

In numerous electrical machines, there is a risk of a mixture of dust and oil collecting in the end windings during operation which can lead to leakage paths and therefore to insulation faults.

The high-voltage windings are usually earthed on the outside in the region of the laminated cores. The voltage on the outer surface increases from the slots of the laminated cores to the electrical connecting points of the individual winding bars until it reaches the high voltage of the machine. This high voltage on the outer surface of the winding requires adequate clearances in air between the winding elements themselves and the winding elements which are at earth potential or which belong to a different phase. When the machine, and especially the winding, is contaminated, there is a certain risk of partial discharges and leakage paths on the winding. This can lead to faults and to the breakdown of the insulation.

If the end windings as a whole are now earthed, the clearance in air between the winding elements can be optimized with regard to other parameters, in particular with regard to cooling. The clearances in air of the winding elements with respect to the earthed parts of the machine can then be eliminated or at least drastically reduced. In this way, the electrical machine becomes more tolerant to faults with regard to dust and moisture.

The earthing of the end windings as a whole can advantageously be realized using the insulating caps according to the invention. However, it is also conceivable to achieve the advantages of overall earthing in a different way without the special insulating caps.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCES

10 End winding
11, 12 Winding bar
13 Insulation
14 Conductor
15 Lug
16, 16a,b Insulating cap
17 Interior
18 Inner conductor layer or semiconductor layer
19 Gradient layer
20 Insulating layer
21 Outer conductor layer or semiconductor layer
22 Overlapping zone
23 Opening (insulating cap)

What is claimed is:

1. An insulating cap for an end winding of an electrical machine working at a high voltage, the end winding including a plurality of insulated winding bars electrically conductively connected to one another in pairs at their ends so as to form a plurality of electrical connections, the insulating cap comprising:

an opening allowing the insulating cap to be pushed over a region of one of the electrical connections such that the insulating cap insulates an outside of the electrical connection;

an interior including a layer configured to gradually dissipate a high electrical field in the region of the electrical connection to an outside of the insulating cap, the outside of the insulating cap being at earth potential, wherein the layer includes a gradient layer including a gradient material reaching from the region of the electrical connection to the opening of the insulating cap when the insulating cap is pushed on; and a central insulating layer, an outer layer disposed on an outside of the central insulating layer, and an inner layer disposed on an inside of the central insulating layer in the region of the electrical connection, wherein the gradient layer reaches from the inner layer to the opening of the insulating cap, wherein the gradient layer overlaps the inner layer in a limited overlapping zone.

2. The insulating cap as recited in claim 1, wherein the outer layer includes at least one of a conductor and a semiconductor layer.

3. The insulating cap as recited in claim 1, wherein the inner layer includes at least one of a conductor and a semiconductor layer.

4. The insulating cap as recited in claim 1, wherein at least a portion of the gradient layer is embedded in the central insulating layer.

5. The insulating cap as recited in claim 1, wherein at least a portion of the gradient layer is disposed on the central insulating layer.

6. An electrical machine configured to work at a high voltage comprising:

an end winding including a plurality of insulated winding bars electrically conductively connected to one another in pairs at their ends so as to form a plurality of electrical connections;

a plurality of insulating caps each having an opening allowing each of the plurality of insulating caps to be pushed over a region of a respective one of the electrical connections such that each of the plurality of insulating caps insulates an outside of the respective electrical connection, wherein an interior of each of the plurality of insulating caps includes a gradient layer including a gradient material configured to gradually dissipate a high electrical field in the region of the electrical connection to an outside of the insulating cap;

wherein the layer includes a gradient layer including a gradient material reaching from the region of the electrical connection to the opening of the insulating cap when the insulating cap is pushed on; and a central insulating layer, an outer layer disposed on an outside of the central insulating layer, and an inner layer disposed on an inside of the central insulating layer in the region of the electrical connection, wherein the gradient layer reaches from the inner layer to the opening of the insulating cap, wherein the gradient layer overlaps the inner layer in a limited overlapping zone.

7. The electrical machine as recited in claim 6, wherein at least one of the insulating caps is earthed on an outside of the insulating cap.

8. The electrical machine as recited in claim 6, wherein each of the plurality of insulating caps is earthed on an outside of each insulating cap.

\* \* \* \* \*